(12) United States Patent  
Symes et al.

(10) Patent No.: US 12,333,269 B2  
(45) Date of Patent: Jun. 17, 2025

(54) DOT PRODUCT ARRAY

(71) Applicant: Arm Limited, Cambridgeshire (GB)

(72) Inventors: Dominic Hugo Symes, Cambridge (GB); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 947 days.

(21) Appl. No.: 17/474,619

(22) Filed: Sep. 14, 2021

(65) Prior Publication Data

US 2023/0080578 A1    Mar. 16, 2023

(51) Int. Cl.
  *G06F 7/48*    (2006.01)
  *G06F 17/16*    (2006.01)

(52) U.S. Cl.
  CPC ............ *G06F 7/4812* (2013.01); *G06F 17/16* (2013.01)

(58) Field of Classification Search
  CPC ....... G06F 7/4812; G06F 7/4806; G06F 17/16
  See application file for complete search history.

(56) References Cited

U.S. PATENT DOCUMENTS 10,673,438 B1 *   6/2020   Elkins ................ H03K 19/1776

FOREIGN PATENT DOCUMENTS

GB    2548908    10/2017

OTHER PUBLICATIONS

Arm A64 Instruction Set Architecture, Armv9, for Armv9-A architecture profile, 2021, 12 pages.

* cited by examiner

*Primary Examiner* — Andrew Caldwell
*Assistant Examiner* — Jonathan David Warner
(74) *Attorney, Agent, or Firm* — NIXON & VANDERHYE P.C.

(57) ABSTRACT

A dot product array comprises dot product circuits each to process a respective pair of first and second input vectors to generate a respective dot product result. In a real number mode, each dot product result and vector element represents a respective real number. In a hypercomplex number mode, an input vector manipulation is applied to at least one of the first/second input vectors to be supplied to each dot product circuit, to cause the dot product array to generate hypercomplex dot product results each indicating a sum of hypercomplex products of corresponding pairs of hypercomplex numbers. In the hypercomplex number mode, respective subsets of elements of the first/second input vectors represent respective hypercomplex numbers, for which respective components are represented by different elements of the subset, and each hypercomplex dot product result comprises components represented by the dot product results generated by a corresponding group of at least two dot product circuits.

18 Claims, 9 Drawing Sheets

2x2x8 microblock in real number mode

2x2x4 microblock in complex number mode

DOT PRODUCT ARRAY

BACKGROUND

Technical Field

The present technique relates to the field of data processing.

Technical Background

A dot product operation is an operation applied to first and second input vectors to generate a result value indicating a sum of products of corresponding pairs of elements of the first and second input vectors. Dot product operations can be useful in implementing a convolutional neural network, for example.

SUMMARY

At least some examples provide an apparatus comprising: a dot product array comprising a plurality of dot product circuits each to process a respective pair of first and second input vectors to generate a respective dot product result indicating a sum of products of corresponding pairs of elements of the first and second input vectors, where in a real number mode of operation, each dot product result and each element of each pair of first and second input vectors represents a respective real number; and input vector manipulating circuitry to apply, when in a hypercomplex number mode of operation, an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

At least some examples provide a method comprising: processing respective pairs of first and second input vectors using a plurality of dot product circuits of a dot product array, to generate respective dot product results each indicating a sum of products of corresponding pairs of elements of a corresponding pair of first and second input vectors, where in a real number mode of operation, each dot product result and each element of each pair of first and second input vectors represents a respective real number; and when in a hypercomplex number mode of operation, applying an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

At least some examples provide a non-transitory computer-readable medium to store computer-readable code for fabrication of an apparatus comprising: a dot product array comprising a plurality of dot product circuits each to process a respective pair of first and second input vectors to generate a respective dot product result indicating a sum of products of corresponding pairs of elements of the first and second input vectors, where in a real number mode of operation, each dot product result and each element of each pair of first and second input vectors represents a respective real number; and input vector manipulating circuitry to apply, when in a hypercomplex number mode of operation, an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

Further aspects, features and advantages of the present technique will be apparent from the following description of examples, which is to be read in conjunction with the accompanying drawings.

DESCRIPTION OF EXAMPLES

Figure 1:
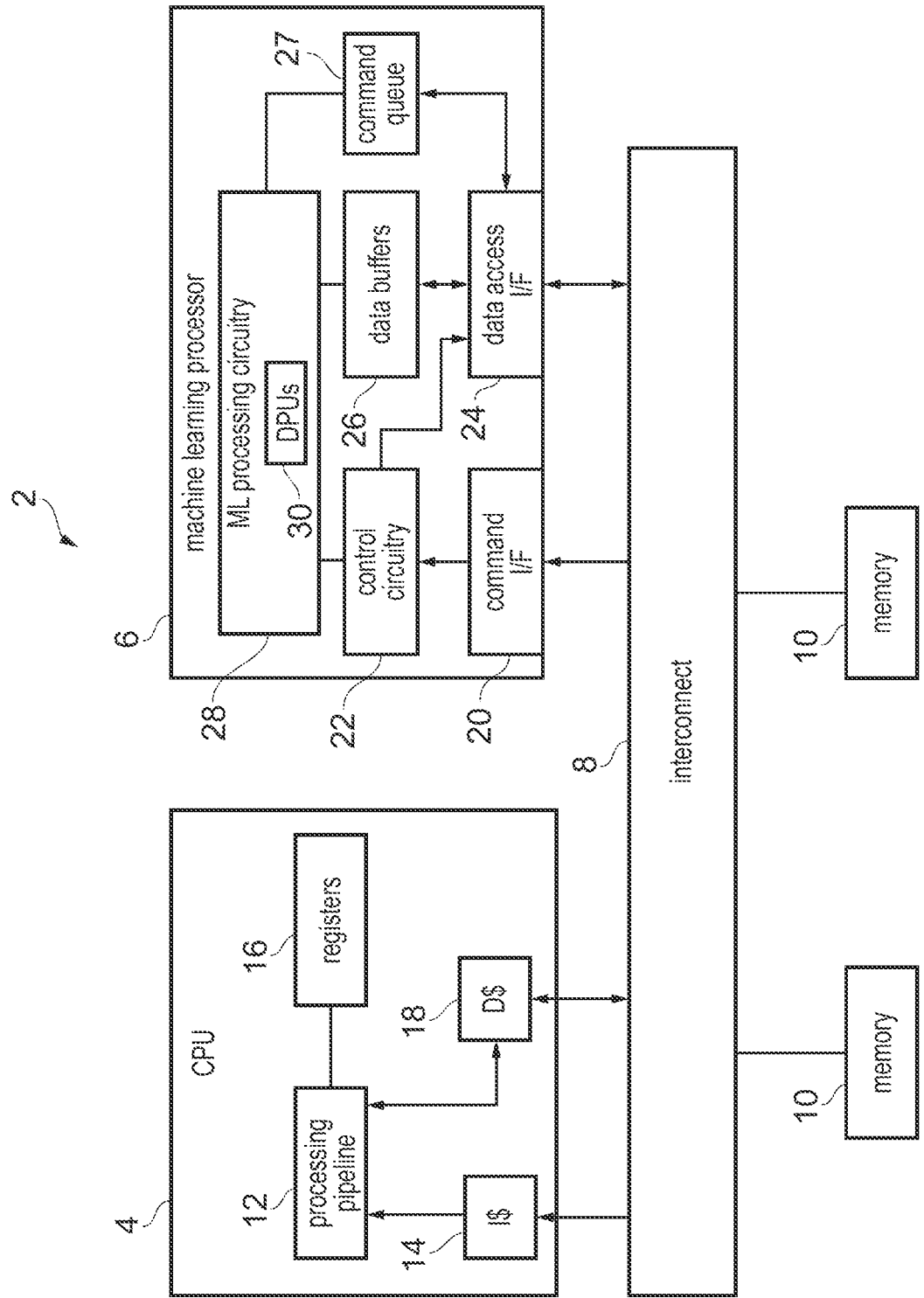
FIG. 1 schematically illustrates an example of a data processing system including a machine learning processor.

An apparatus has a dot product array comprising a number of dot product circuits, each dot product circuit for processing a respective pair of first and second input vectors to generate a respective dot product result indicating a sum of products of corresponding pairs of elements of the first and second input vectors. Providing an array of dot product circuits to allow a number of dot product results to be computed can be useful in a range of fields of application, but can particularly be useful in the field of machine learning where it may be common for machine learning models such as convolutional neural networks to require a significant number of matrix multiplications, and those matrix multiplications can be decomposed into a series of dot product operations. Such a dot product array may be designed to support dot product operations applied to vectors of real numbers so that each vector element of the first and second input vectors represents a respective real number. Hence, the circuit arrangement of the dot product array may be designed to select the correspondingly positioned vector elements of the first and second input vectors and multiply each pair of the correspondingly positioned vector elements together, and add the products of the respective pairs of elements to produce the dot product result.

However, for certain operations, such as Fast Fourier Transform (FFT) or complex filters, it can be useful to support a hypercomplex number version of a dot product operation, where the numbers being multiplied to produce the products which are sum together are hypercomplex numbers having a certain number of components. For example, the hypercomplex numbers could be complex numbers comprising a real component and an imaginary component, or could be other types of hypercomplex number which have more than two components. Hypercomplex numbers are a generalisation of complex numbers in a variable number of dimensions of number space. Complex numbers can be regarded as points on a two-dimensional plane where one coordinate is the real component counted in units of '1' and another coordinate is the imaginary component counted in units of "i", an imaginary unit equivalent to the square root of −1. Hypercomplex numbers in more than two dimensions may add further components representing the coordinate of the number in further dimensions.

When hypercomplex numbers are multiplied together then each component of the product result may depend on a combination of two or more components of the first hypercomplex number with two or more components of the second hypercomplex number, so at first sight, the element-by-element processing of the dot product array which calculates pairwise products of correspondingly positioned elements of a pair of input vectors may not appear to be sufficient, and one may assume that producing a circuit that can calculate a hypercomplex dot product result may require a bespoke circuit separate from the dot product circuit which supports dot products of real numbers.

However, the inventors recognised that, by providing a manipulation of the input vectors supplied to each dot product circuit of the dot product array, it is possible to reuse a dot product array designed to support a real number mode of operation for the dot product calculations to also support a hypercomplex number mode of operation. Hence, the apparatus comprises input vector manipulating circuitry to apply, when in a hypercomplex number mode of operation, an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers. In the hypercomplex number mode, each of the first and second input vectors comprises a number of subsets of elements, with each subset representing a respective hypercomplex number for which respective components of the hypercomplex number are represented by different elements of the subset, and each hypercomplex dot product result comprises at least two components represented by the dot product results generated by a corresponding group of at least two dot product circuits of the dot product array.

Hence, while in the real number mode each dot product circuit would produce an independent dot product result representing a separate real number from the dot product results generated by other dot product circuits. In the hypercomplex number mode, the dot product circuits may be allocated as groups of at least two dot product circuits and each group may generate the respective components of a hypercomplex number provided as a hypercomplex dot product result, with the respective components of that hypercomplex number represented by the respective dot product results generated by the two or more dot product circuits of the corresponding group. The circuit area and power cost incurred by the input vector manipulating circuitry can be much lower than if an entirely separate hypercomplex dot product array was provided separate from the dot product array used for real number operations, and so this approach enables support for hypercomplex dot product operations to be provided at relatively little additional circuit area and power cost.

Other than the input vector manipulation applied by the input vector manipulating circuitry to the first and second input vectors to be supplied to each dot product circuit of the dot product array, operation of the dot product array can be the same in both the real number mode and the hypercomplex number mode. Hence, adding the support for the hypercomplex number mode may require little modification of the circuit design of the dot product array, so require limited development cost, circuit area and power consumption.

As mentioned above, in the hypercomplex number mode each of the first and second input vectors supplied to each dot product circuit may be considered to include a number of subsets of elements, with each subset representing a respective hypercomplex number, and the respective components of the hypercomplex number represented by different elements of the subset. It would be possible for the respective components of the hypercomplex number to be arranged in different arrangements within the first and second input vectors. For example, one approach could be to group all of the components of the same type together for a number of different hypercomplex numbers. For example, if the hypercomplex number is a complex number having a real component and an imaginary component, all the real components of the hypercomplex numbers represented by a given vector could be grouped together in one half of the vector and all the imaginary components of the hypercomplex numbers could be grouped together in another half of the vector. More arbitrary component arrangements could also be used if desired.

However, it can be particularly useful if, in the hypercomplex number mode, for a given hypercomplex number represented by one of the first and second input vectors, the subset of elements which represents the given hypercomplex number is at two or more adjacent vector element positions within that one of the first and second input vectors. In other words, the respective components of the hypercomplex numbers may be interleaved in a pattern such as component 1, component 2, component 1, component 2, etc. (or for hypercomplex numbers with more than two components, a pattern such as 1, 2, 3, 4, 1, 2, etc.). Having the different components of the same hypercomplex number at adjacent vector element positions can simplify access to memory for obtaining the operands of the operations as it tends to be simpler to load data from contiguous blocks of memory into adjacent elements of the vector, so this approach means that the various components of a single hypercomplex number can be stored at a contiguous portion of memory, rather than being split up across a number of discontiguous regions. This can make managing layout of the data in memory simpler. For some micro-architectural implementations of a dot product array, placing the different components of the same hypercomplex number at adjacent vector element positions can also reduce the total amount of circuit area because in the hypercomplex number mode there may need to be some cross-lane swapping of values to allow a given component of the hypercomplex dot product result to depend on multiple different components of the same hypercomplex number represented in the different vector element positions of the input vectors, and typically the circuit elements which are to process adjacent vector elements may be nearer to each other on a chip than circuit elements which are to process vector elements that are further apart in vector position. Therefore, if the respective components of the same hypercomplex number are at adjacent vector element positions then this can reduce the average signal path length needed to transfer those values between lanes. This can help to improve performance.

The arrangement of the respective components of the hypercomplex dot product results in the respective outputs of the dot product circuits may correspond to the arrangement of the components of the hypercomplex numbers within the first and second vectors. This means that when respective outputs of the dot product circuits are gathered together and written back to a data buffer or memory, they may already be in the format required for arranging the components of the hypercomplex numbers in the first and second input vectors if those hypercomplex dot product results are later to be used as inputs to a subsequent hypercomplex dot product operation.

The input vector manipulation applied by the input vector manipulating circuitry may differ depending on which component of the hypercomplex dot product result is to be represented by the dot product result generated by a given dot product circuit. Hence, a component-specific input vector manipulation may be used, applying different input vector manipulations for different dot product circuits. This allows the respective components of the hypercomplex dot product result to be generated using the same dot product circuits that would, in the real number mode of operation, generate independent dot product results for representing different real numbers.

Input vector selection circuitry may be provided to select the pair of first and second input vectors to be supplied to each dot product circuit of the dot product array. In the real number mode, to enable a number of independent dot product results to be generated, the input vector selection circuitry would normally select a different pair of first and second input vectors for each dot product circuit, although different dot product circuits may share the same value for one of the first and second input vectors. Similarly, in the hypercomplex number mode, there may be some sharing of inputs between different dot product circuits. Hence, the input vector selection circuitry may select the pair of first and second input vectors for each dot product circuit of the dot product array so that for two or more different dot product circuits of the dot product array, the same input vector may be reused as the unmanipulated value of one of the pair of first and second input vectors (prior to any manipulation being applied by the input vector manipulating circuitry if the hypercomplex number mode is used) with different input vectors being provided as the unmanipulated value of the other of the pair of first and second input vectors for the two or more different dot product circuits. In other words, the inputs supplied to the dot product circuits could correspond to a number of different combinations of the same set of input vectors so that different outputs can be calculated using the same first input but different second inputs or using the same second input but different first inputs. This approach can be particularly useful for machine learning operations such as in a convolutional neural network, where there may be a need to perform dot products on various combinations of a common set of inputs.

In the real number mode, it may be expected that each dot product circuit is given a different pair of operands (selected from a different pair of input locations) as the first and second input vectors, with no two dot product circuits given operands from exactly the same pair of input locations, so as to increase the range of different dot product results that can be calculated (two dot product circuits may share one of their operands, but not both). The "input locations" associated with a given pair of operands could refer to input locations within a set of input data to be processed, or could correspond to memory locations at which the input data is stored in memory.

However, in the hypercomplex number mode, the input vector selection circuitry may select the pair of first and second input vectors for each dot product circuit, such that for each of the at least two dot product circuits within a given group of the dot product array that is to calculate the respective components of a hypercomplex dot product result, the input vector selection circuitry selects the same pair of first and second input vectors for each of those at least two dot product circuits in the group. This allows the correct hypercomplex dot product result to be calculated where each component of the hypercomplex dot product results may depend on a certain permutation of multiple components of the pair of complex numbers represented by the corresponding subsets of elements within the first and second input vectors. Note that, when it is said that the same pair of first and second input vectors are selected for each dot product circuit within a given group, this refers to the values of the first and second input vectors prior to any manipulation being applied by the input vector manipulating circuitry. Hence, in the hypercomplex number mode, the input vector manipulating circuitry applies different component-specific manipulations to at least one of the same pair of the first and second input vectors to generate different pairs of manipulated first and second input vectors to be processed by the at least two dot product circuits of the given group. Therefore, while the inputs selected for each dot product circuit within the given group start off representing the same hypercomplex numbers, the different component-specific manipulations mean that at the point when the manipulated first and second input vectors are supplied to the dot product circuits then the at least two dot product circuits of the given group may nevertheless receive different values for their first/second input vectors (at least for some numeric values of the input vectors—there are also some combinations of numeric values, such as when each component of the input hypercomplex numbers is zero, when the values supplied to the dot product circuits in the given group may remain the same as the values in the selected pair of first/second input vectors, despite the manipulations being applied).

The hypercomplex numbers supported in the hypercomplex number mode of the dot product array may be any hypercomplex number. In some implementations, support could be provided for hypercomplex numbers with greater than two dimensions, such as Quaternions or Octonions, which are hypercomplex numbers with four and eight components respectively. In some cases, the dot product array may support two or more different types of hypercomplex number modes, so that there may be a number of variants of the hypercomplex number mode supporting different types of hypercomplex numbers, with each variant associated with a different pattern of input vector manipulations for the respective dot product circuits of the dot product array.

However, for many practical applications supporting complex numbers as the hypercomplex number may be sufficient. A complex number comprises a real component and an imaginary component and is an example of a hypercomplex number in two dimensions. Processing of complex numbers in dot product operations can be useful for operations such as FFT or complex filters. Hence, for a complex number mode (which is a specific example of the hypercomplex number mode described above), each hypercomplex number in the first and second input vectors is a complex number having a real and imaginary component, each hypercomplex dot product result is a complex dot product result having real and imaginary components, each subset of elements within the input vectors comprises two elements representing the real and imaginary components of a complex number respectively, and each group of dot product circuits comprises two dot product circuits to calculate the respective real and imaginary components of a corresponding hypercomplex dot product result.

In the case where the hypercomplex number mode supported is the complex number mode, then the dot product circuits may, in the (hyper)complex number mode, be logically divided in halves, so that half of the dot product circuits are to generate dot product results representing the real components of complex dot product results and the other half of the dot product circuits generate dot product results representing the imaginary components of the complex dot product results. Each group of dot product circuits includes one dot product circuit that is to generate the real component and one dot product circuit that is to generate the imaginary component.

For those dot product circuits that are to generate a dot product result representing the imaginary component of a complex dot product result, the input vector manipulation may comprise, for a given corresponding pair of complex numbers represented in the first and second input vectors by a first subset of two elements of the first input vector and a second subset of two elements of the second input vector, swapping the two elements of one of the first subset of elements and the second subset of elements. The other of the first subset of elements and the second subset of elements can be left unchanged. It does not matter which of the first and second input vectors has its subset of two elements switched. Some implementations may choose to apply the swapping to the elements of the first input vector and others may choose to apply the swapping to the second input vector. Some implementations may even choose to swap the first subset of elements of the first input vector at some vector positions for a subset of the (hyper)complex numbers represented by the first input vector, while at positions corresponding to different (hyper)complex numbers within the same input vector, the swapping could instead be applied to the second subset of elements within the second input vector, Hence, it is not essential to manipulate the same input vector throughout the vector width, as the same processing result could be achieved in different ways, as long as for each pair of complex numbers one of the first and second subsets of two elements is swapped and the other is left unchanged.

On the other hand, for a dot product circuit that is to generate a dot product result representing the real component of the complex dot product result, the input vector manipulation may comprise, for a given corresponding pair of complex numbers comprising a first complex number represented in the first input vector by a first real-component element and a first imaginary-component element and a second complex number represented in the second input vector by a second real-component element and a second imaginary-component element, negating one of the first imaginary-component element and the second imaginary-component element. The other of the first imaginary-component element and the second imaginary-component element is left unchanged. Also, either both the first real-component element and the second real-component element are left unchanged, or both the first real-component element and the second real-component element can be negated in the input vector manipulation (since $(-a)*(-b)=a*b$, the result is the same regardless of whether none or both of the first/second real-component elements are negated). Again, there may be different implementation choices as to which of the first/second imaginary-component elements is negated, and the imaginary-component element that is negated may be selected from the same input vector for each (hyper)complex number in the first/second input vectors, or could be selected differently for each different pair of (hyper)complex numbers within the first and second input vectors, similar to the discussion above for the swapping of elements described for calculating the imaginary component of the (hyper)complex dot product result. Hence, the input vector manipulations applied by the input vector manipulating circuitry may be relatively simple operations, comprising a swapping of elements or a negation (changing of the sign from positive to negative, or vice versa), and so this does not require a significant amount of additional circuitry and so can be efficient to implement.

The dot product array may take as inputs, elements of the first and second input vectors which are represented in a sign-magnitude representation. This may differ from many arithmetic circuits in a typical data processor which may often represent the input numbers as a two's complement representation. In a sign-magnitude representation, each of the bits of the binary number is considered to have a negative weighting if the sign bit is 1, in contrast to a two's complement representation for which the most significant bit has a negative weighting but all other less significant bits have a positive weighting regardless of the sign bit value. The sign-magnitude representation can be useful for a dot product array such as the one discussed above because for many of the applications for which the dot product array can be useful, such as convolutional neural networks, for both positive and negatively signed numbers it can be much more common for the numbers being processed to have a relatively small magnitude close to zero, in comparison to larger magnitudes further away from zero. If a two's complement representation was used, this would mean that negative numbers with a relatively small magnitude would be represented using binary values having a large number of bits set to 1 (e.g. the value −1 would be represented by 11111 . . . 111), which would mean that when multiplying the numbers to produce the dot product results this would result in a relatively large number of carries being propagated from one bit position to the next. Such carries increase the amount of toggling of bits between 0 and 1 which will tend to increase power consumption. By using the sign-magnitude representation (for which a value of −1 can be represented as 10000 . . . 001, where the most significant bit is the sign bit), this means that negative numbers of small magnitudes may be represented with most of the bits being set to 0, reducing bit toggling and therefore saving power.

The use of the sign-magnitude representation for the elements of the first and second input vectors can be particularly useful in the (hyper)complex number mode because it means that, when negating an element that represents an imaginary component within the first or second input vectors, this can be done efficiently simply by switching the sign bit of the corresponding element, rather than requiring all the bits to be inverted and then one to be added as in a two's complement representation. Hence, the negation for negating one of the elements representing the imaginary component among the first and second subsets of two elements of the first and second input vectors does not require a significant amount of circuitry, but can be implemented simply with a NOT gate applied to the sign bit of the element being negated.

The dot product circuits of the dot product array may be arranged to generate their respective dot product results in parallel. Hence, this can provide improved performance when needing to calculate a large number of dot product results, which is particularly useful in the machine learning field of application.

In the hypercomplex number mode, for a given hypercomplex dot product result, the dot product array can generate the respective components of the given hypercomplex dot product result in parallel with each other. Hence, it is not necessary to perform multiple separate operations, execute separate instructions, or use multiple separate passes through a set of calculating hardware, to calculate the respective components of the hypercomplex dot product result. A full hypercomplex dot product result can be calculated in a single pass by parallel operations which generate the respective components of the hypercomplex dot product result using a group of at least two dot product circuits of the dot product array.

The technique discussed above can be particularly useful where the dot product array is part of a hardware accelerator. A hardware accelerator may be a bespoke piece of hardware designed to carry out certain bespoke tasks with improved performance or better energy efficiency than may be possible when carried out using general purpose instructions executed by a general purpose processor such as a central processing unit (CPU). The hardware accelerator may be configurable by the CPU issuing memory mapped commands which configure the machine learning processor to obtain its operands from memory, process the data and then write results back to memory. In particular, it can be useful for the dot product array and input vector manipulating circuitry to be provided within a machine learning processor, which is a particular example of a hardware accelerator where the bespoke task to be performed is processing of a machine learning model and other related operations. For example, the machine-learning model could be a convolutional neural network. The machine learning processor could also be referred to as a machine learning accelerator, a deep learning processor, a deep learning accelerator, or a neural processing unit (NPU). For example, the apparatus (machine learning processor) may comprise hardware circuitry designed to accelerate processing of at least one of: matrix multiplication operations, and convolutional neural network operations, that hardware circuitry comprising the dot product array described above. Such machine learning processors may particularly be designed to exploit data reuse between different dot product operations calculating respective dot product results, so that there may be a network of dot product circuits, which act on a common set of inputs in different combinations to produce respective outputs. The design of such a machine learning processor may be relatively complex with a lot of development going into designing circuitry for managing the flow of inputs into the dot product array and the reading of outputs from the dot product array so as to control the reuse of data between operations and implement the overall machine learning model being processed. Hence, it can be a particular advantage that, to support the hypercomplex number mode, the overall data flow need not change significantly, but the hypercomplex number mode can be supported simply by applying a relatively simple manipulation of the input vectors just before they are supplied to the dot product circuits at the dot product array. Hence, this may greatly increase the functionality available at a machine learning processor with relatively little cost in development and additional circuit area and power consumption.

FIG. 1 schematically illustrates an example of a data processing system 2, having a general-purpose processor (in this example a central processing unit, or CPU) 4 and a machine learning processor 6, which are coupled by an interconnect 8 to share access to shared memory 10. Although not shown in FIG. 1, the system 2 may also have other components such as additional processors, e.g. one or more further CPUs 4 or a graphics processor unit (GPU), or other devices capable of initiating memory accesses, such as display controllers, peripheral controllers, network controllers, etc. The interconnect 8 routes memory access requests and responses across the system 2 and can also manage functions such as cache coherency.

The CPU 4 is capable of executing program instructions defined according to an instruction set architecture, to perform data processing operations represented by the instructions. The CPU has a processing pipeline 12 which has a number of pipeline stages including a decode stage for decoding program instructions fetched from an instruction cache 14 or from memory 10, and an execute stage for executing the decoded instructions to perform the corresponding data processing operations. Registers 16 are provided to store operands for the executed instructions and results of executed instructions are written back to the registers 16. A data cache 18 is also provided for caching a subset of data from the memory 10 for faster access by the CPU 4. In response to load/store instructions executed by the processing pipeline 12, the CPU 4 may load data from the cache 18 or memory 10 to the registers 16, or store data from registers 16 to the cache 18 or memory 10.

The machine learning processor 6 is a hardware accelerator for accelerating operations which are common in machine learning applications, such as convolutional neural networks. For example, the machine learning processor 6 may provide faster processing of matrix multiplication operations which may be the backbone of such machine learning models. While it may be possible to perform the same operations using general purpose instructions executed by the CPU 4, the machine learning processor 6 may have hardware which offers a greater level of parallelism than is possible using the CPU 4, to provide faster performance and lower power. The machine learning processor 6 may also be referred to as a machine learning accelerator, deep learning processor, deep learning accelerator, or neural processing unit (NPU). The machine learning processor 6 has a command interface 20 via which configuration commands issued by the CPU 4 are received by the machine learning processor 6. The configuration commands are memory mapped commands, which means that part of the address space accessible to the CPU 4 is allocated for being a target of a machine learning processor configuration command so that when the processing pipeline 12 executes a store operation to request that data is stored to a target address mapped to the region or regions allocated for the command interface 20, then this is interpreted as a machine learning processor configuration command which can configure control parameters within registers of the machine learning processor 6 which control how it performs it processing. One of these control parameters may specify a base address of a command stream stored in memory which represents a series of commands to be processed by the machine learning processor 6. The machine learning processor 6 has a data access interface 24 for issuing memory access requests via the interconnect 8 to memory 10 and receiving responses to those requests, which allows the machine learning processor 6 to load commands from the command stream in memory into a command queue 27, and to load data from memory 10 into some internal data buffers 26 or store data from the data buffers 26 back to memory 10. Each command loaded to the command queue 27 may specify an operation to be performed, such as a convolution or pooling operation, and the encoding of the command identifies the type of command and/or identifies parameters associated with the command. The command stream may specify the addresses of data to be loaded and processed as offsets relative to the command stream base address that was configured by the CPU 4.

As explained further below, for convolutional neural networks it may be common that a same set of operations need to be iterated over many different blocks of data loaded from memory and so the control circuitry 22 of the machine learning processor may, among other tasks, be responsible for generating, based on configuration parameters set by the received configuration commands received from the CPU, the series of addresses from which commands and data are to be loaded and addresses to which data is to be stored in order to implement the required operations according to the machine learning model being processed. Machine learning processing circuitry 28 executes the required processing operations on the loaded data to generate processing results, which may be written back to data buffers 26 and used as operands for subsequent operations or stored back to memory. The machine learning processing circuitry 28 may have arithmetic processing circuit logic for supporting various types of operations, which may be useful when performing machine learning processing. However, one particular operation that may be extremely useful is a convolution operation which is very common in machine learning models. This can be implemented as a set of vector dot product operations. Hence, the machine learning processing circuitry may have a dot product array 30 comprising a number of dot product units (DPUs) which are hardware circuits for performing a number of vector dot product operations in parallel to each other.

Figure 2:
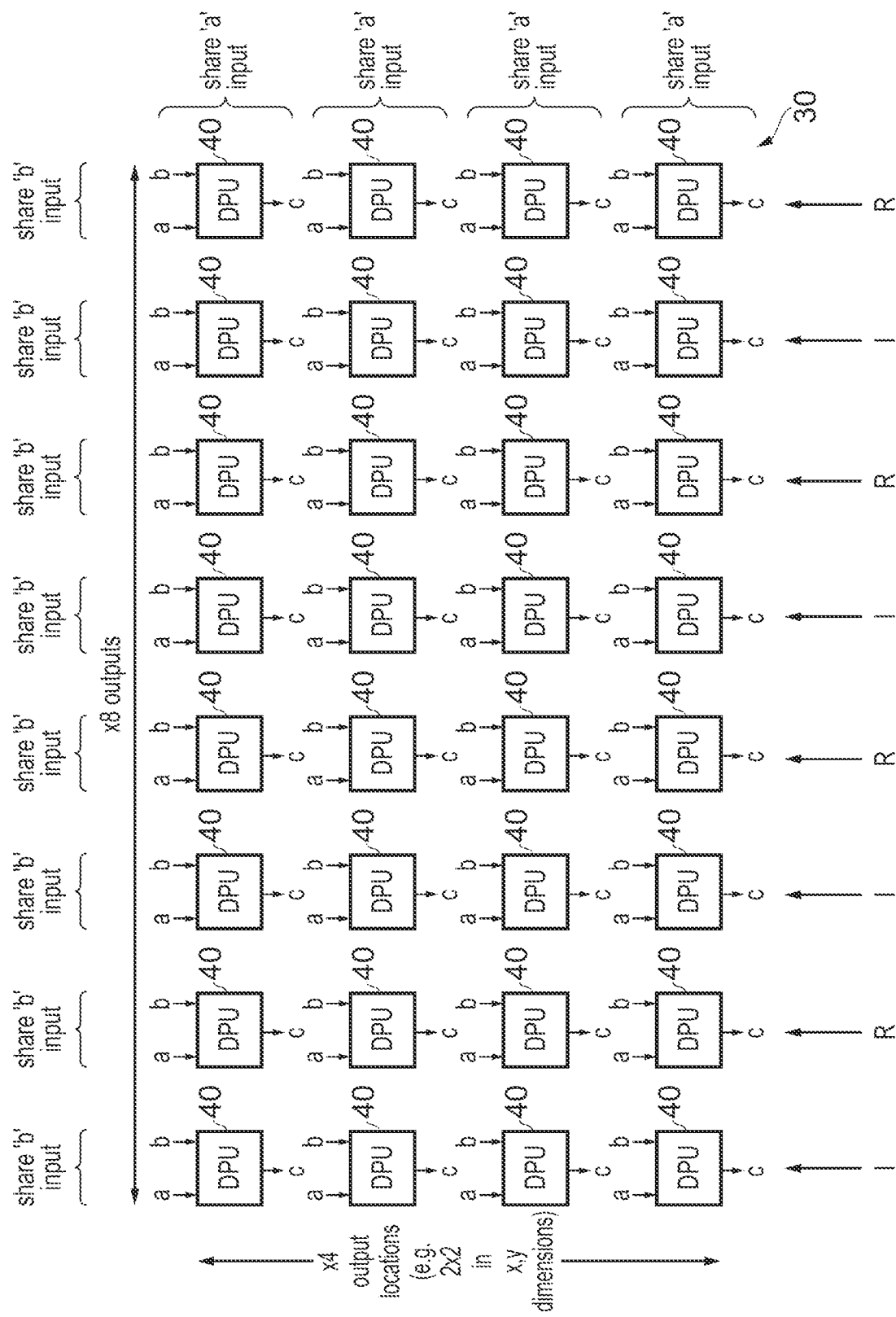
FIG. 2 illustrates an example of a dot product array.

FIG. 2 illustrates the dot product array 30 in more detail. As shown in FIG. 2, the dot product array 30 includes a certain number of dot product units 40 which each take as inputs a first input vector a and a second input vector b and compute a scalar result c which corresponds to the dot product of the two input vectors a and b. Each input vector comprises a certain number of vector elements with each vector element representing an independent data value (as opposed to a scalar value where all the bits of the scalar value are collectively interpreted as a single numeric value).

Figure 3:
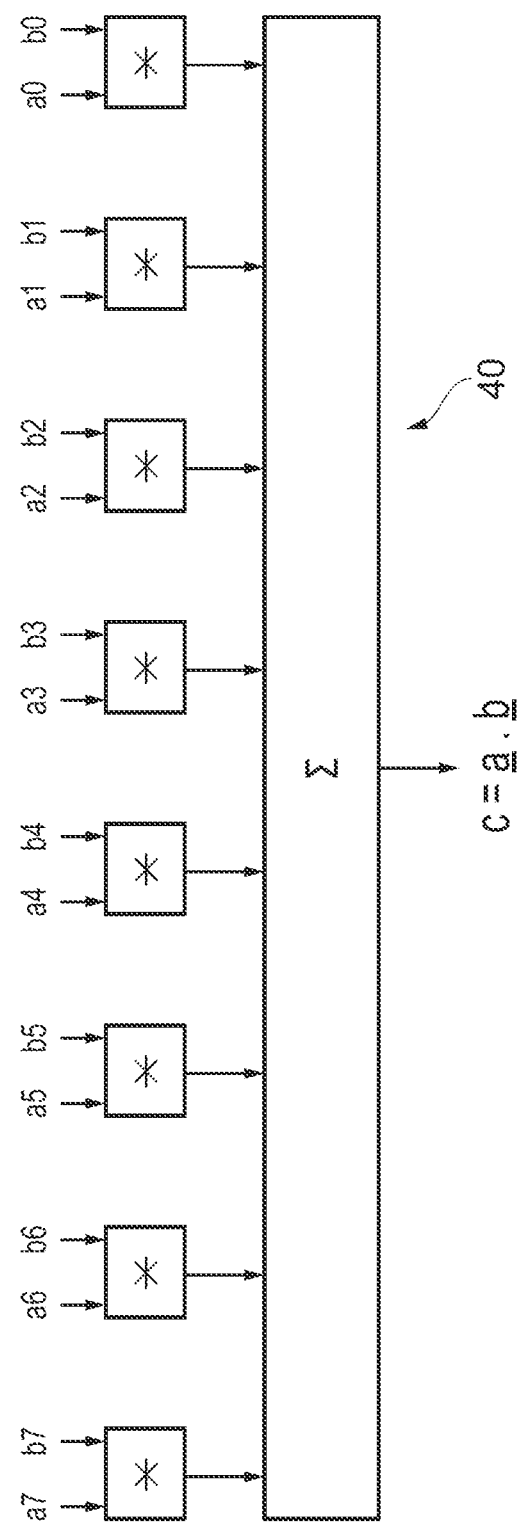
FIG. 3 shows an example of a dot product circuit of the dot product array.

The dot product result output by a given DPU 40 represents the sum of the products of corresponding pairs of elements of the first and second input vectors a, b. This is illustrated in more detail in FIG. 3, which shows an example of an individual DPU 40 or the array 30. As shown in FIG. 3, each of the input vectors a and b comprises a certain number of elements, which in this example is 8 elements, with the first input vector 'a' comprising elements a0 to a7 and the second input vector 'b' comprising elements b0 to b7. The DPU 40 multiplies each pair of correspondingly positioned vector elements, and adds the products of each pair of elements together to produce the scalar dot product result 'c'. Hence, element a0 of the first input vector is multiplied by element b0 of the second input vector, element a1 of the first input vector is multiplied by element bi of the second input vector, and so on for each of the other pairs of correspondingly positioned vector elements. While FIG. 3 is a schematic illustration showing an example where the products of the pair developments are calculated first and then added together, it is not essential for a specific data value representing the product of an individual pair of elements to be explicitly calculated in order to find the dot product result. A multiplication may be implemented as a sum of partial products of pairs of elements, and it would be possible, for example, for some of the partial products of a given pair of vector elements to be added to partial products from other pairs of vector elements in such a way that, while the end result is the required dot product result value c, which corresponds to the sum of all the partial products calculated in all the multiplications, the actual multiplication result from multiplying a particular 'a' element ai by the corresponding 'b' element bi may never be explicitly evaluated, as some of the partial products from that multiplication may have been added to results of other multiplications before all the partial products of the ai*bi multiplication were calculated/added. Hence, it will be appreciated that the DPU will calculate the dot product result in any manner than enables the result 'c' to indicate the sum of the products of corresponding pairs of elements of the first and second input vectors, but need not do this in the particular way shown in FIG. 3.

Returning to FIG. 2, it can be useful to provide for data reuse between the respective DPUs 40 of the dot product array 30, so that some DPUs may share the same value for the first input vector a but may combine that first input vector with different values for the second input vector b, while other DPUs may share the same value for the second input vector b but may have different values for the first input vector a. For example, in FIG. 2 there are 32 DPUs 40 arranged in a 4×8 array and the 8 DPUs within the same row of FIG. 2 share the 'a' input but have different 'b' inputs, while the 4 DPUs 40 within the same column of FIG. 2 share the same 'b' input but have different values for the 'a' inputs. This data reuse is useful for machine learning applications because it is common that the same activations and weights of a neural network need to be multiplied with each other in many different combinations and so by enabling the same weight or the same activation to be combined with many other activation or weights in different combinations can allow the ratio of processing operations to load/store operations to be increased to improve performance. For example in a convolution implementing a matrix multiplication the 'a' inputs may be taken from different rows of the a first input matrix and 'b' inputs may be taken from different columns of a second input matrix.

The eight dot product results 'c' within a given row can be written to the data buffer from which they can be read out as the respective elements of one of the 'a' input vectors (for example) for a subsequent iteration of a dot product result. Hence, there may be a number of iterations of dot product calculation and results of one iteration may be fed back as inputs to another iteration.

The DPUs 40 shown in FIG. 2 each calculate their dot product result in parallel to each other, to help improve performance. It will be appreciated that the arrangement of the DPUs 40 and rows and columns as shown in FIG. 2 may be in a logical sense in terms of which values of the input vectors are received by each DPU and does not imply that the DPUs need to be physically located in a grid in rows and columns as shown in FIG. 2. In practice, the circuit units for the DPUs may be implemented in any arrangement relative to each other on a hardware integrated circuit. Also, it will be appreciated that the precise number of DPUs provided and the number of multiplications performed by each DPU are shown in FIGS. 2 and 3 can vary.

Figure 4:
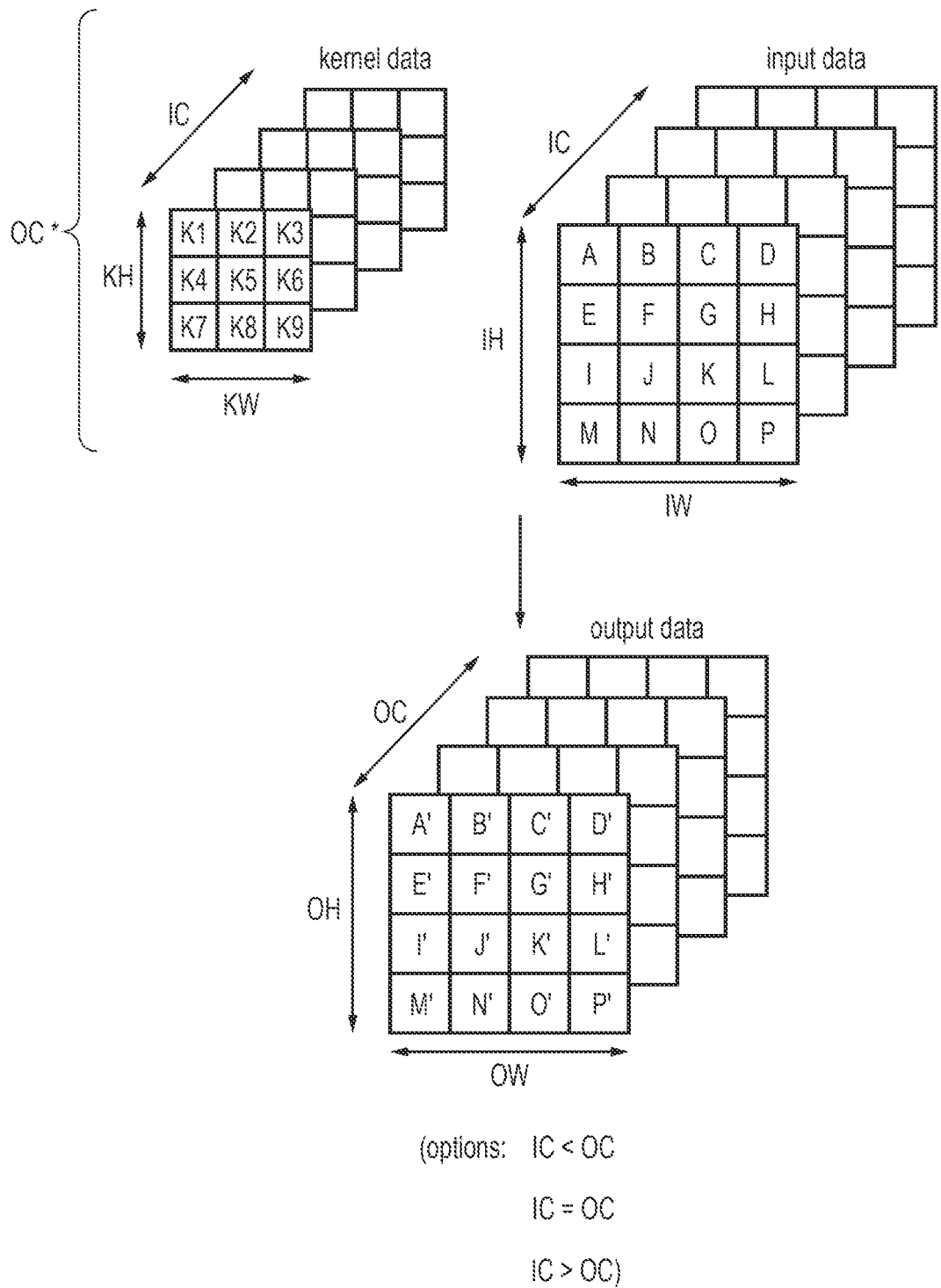
FIG. 4 illustrates an example of a two-dimensional (2D) convolution operation.

FIG. 4 shows an example of a convolution operation which is commonly used in convolutional neural networks. Convolutional neural networks may comprise a number of layers of processing, where the data generated by one layer serves as the input to a next layer. FIG. 4 shows an example of an operation which may be performed at a given layer of the network. The input data to that layer (also referred to as activations or input feature maps) may be defined as a number of input channels, where each input channel comprises a 2D array of a certain size. In this example there are IC channels of input data and each channel has a height IH and width IW. In this example IH and IW are both equal to 4.

At a given layer of the neural network, the set of input data is transformed into a corresponding set of output data comprising OC output channels where each output channel is of dimensions OH, OW. In this example OH and OW are also equal to 4 (the same as for the input channels), but this is not essential and other examples could change the channel height/width between the input and the output. Similarly, in this example the number of output channels OC is equal to the number of input channels IC, but this is not essential and OC could be either greater than, equal to, or less than IC.

The function for transforming the input data into the output data is defined by a set of kernel data (or kernel weights). OC sets of IC arrays of kernel weights are defined (so that there are OC*IC arrays in total), and each output channel of output data is formed by processing the corresponding one of the OC sets of kernel arrays and all IC input channels of activations. Each kernel array comprises KH*KW kernel weights—in this example KH and KW are both equal to 3.

To simply the explanation, the convolution operation is explained first assuming that IC=1 and OC=1, so that there is only a single kernel array comprising kernel weights K1 to K9, a single input channel comprising input activations A to P and a single output channel comprises output data A' to P' as labelled in FIG. 4. If IC=1, each element of the output data channel may be formed by multiplying the respective kernel weights by the corresponding input activations which are at positions at which the kernel array elements would be positioned if the central kernel weight K5 was positioned over the input data element at the corresponding position to the output data element being generated. For example, when generating the output element F', the kernel array is logically considered to be positioned over the input channel data so that the central kernel element K5 is positioned over the input activation F which corresponds in position to the output element F' being generated, and this means the other kernel weights K1, K2, K3, K4, K6, K7, K8, K9 would be positioned over input activations A, B, C, E, G, I, J, K respectively. Hence, respective multiplications of kernel weights and input activations are performed, to add K1*A+K2*B+K3*C+K4*E+K5*F+K6*G+K7*I+K8*J+K9*K=F'. Hence, the positions to be multiplied with each kernel array element depend on the relative position of these other input activations neighbouring the input activation at the position whose output element is being calculated for the output array. Similarly, when calculating the output element G' then the kernel array would be shifted in position and now the multiplications and sums performed would be to generate G'=K1*B+K2*C+K3*D+K4*F K5*G+K6*H K7*J K8*K K9*L.

A similar calculation may be performed for each other position within the output channel. When calculating output elements which are near the edges of the output channel, then when the kernel array is positioned with central element K5 over the corresponding input activation position, some of the elements of the kernel array will extend past the edges of the input channel. In a padded convolution, instead of multiplying these kernel weights by a real input value, the kernel weights that extend outside the input channel boundary can be multiplied by a padding value such as 0. Alternatively, an unpadded convolution may not calculate any output elements A', B', C', D', E', H', L', M', N', O', P' etc. which are at positions which would require the kernel array to extend beyond the bounds of the input channel, and may only produce output data for those positions F', G', J', K' where the kernel can fit entirely within the bounds of the input channel (in this case the dimensions of the output channel may be less than the dimensions of the input channel).

When this operation is scaled up to multiple input channels (IC >1), then there are now IC channels of activations and IC arrays of kernel weights (with a 1:1 mapping between activation channels and kernel weight arrays), and so the single-channel operation described above would be performed for each respective pair of the activation channel and corresponding kernel array, and results obtained for the same position within each set of multiplications added together to form the corresponding element of a single output channel. For example, the value at position F' in the output channel shown in FIG. 4 may correspond to the sum of: the value for position F' resulting from the convolution between kernel array 0 and input data channel 0, plus the value obtained for position F' by convolving kernel array 1 with input data channel 1, plus the value obtained for position F' by convolving kernel channel 2 with input channel 2, and so on until all the input channels IC have been processed (the additions do not necessarily need to be performed in this order—it is possible to rearrange the processing to generate equivalent results).

If the number of output channels is scaled up to be greater than 1, then each output channel is generated by applying the convolution operation described above to the IC input channels, but using a different one of the OC sets of IC kernel channels applied to the IC input channels.

FIG. 4 only shows processing of a 4×4 chunk of the input activation data for a given layer of the neural network. In practice, the input data for a given layer may comprise an array of data of much wider dimensions. Also, the neural network as a whole may comprise many layers, so that the output channels from one layer serve as inputs to the next, with different sets of kernel weights learnt by machine learning to provide different transformation functions at different nodes of the network. Hence it can be seen that such neural network as a whole may require an extremely large number of multiplications between different pairs of kernel weights and input activations and additions of these products. The kernel weights and activation values may be multiplied together in many different combinations. For example a given activation A may need to be multiplied by many different kernel weights and a given kernel weight K1 may need to be multiplied with many different activation values. To speed up processing, the kernel weight data and the input activation data can be laid out in memory in structures in a different logical format to the format shown in FIG. 4. For example, the data structures may be structured to allow the multiplications and accumulations needed for a certain layer of the neural network processing to be implemented by performing matrix multiplications, which may be split into dot product operations. The neural network processing may be implemented through an iterative process which may repeatedly load chunks of input data and kernel weight data to the data buffers 26 of the machine learning processor 6, perform a series of dot product operations on them using the DPUs 30, and write results back to matrix structures in memory 10.

Hence, 2D convolutional operations can be represented in a general sense by the following:

$$ofm[y,x,oc] = \text{sum}_{ky,kx,ic}(\text{if } m[y+ky,x+kx,ic] * weight[oc, ky,kx,ic])$$

where ofm, ifm are 3D tensors, weight is a 4D tensor and data is usually quantized (for example 8-bit integers, where an integer value v in the range −128 to +127 represents a signal value (v*scale+zero_point).

This can be seen as a large number of additions of various products of activations represented in the input channels and weights represented by the kernels, iterated over different output positions x, y, kernel positions kx, ky, input channels, ic, and output channels oc. The machine learning processor 6 is designed to be very efficient at such 2D convolution operations and implements the convolution by splitting it into a number of dot product operations performed by the respective DPUs 30, where each DPU takes 8 inputs from the input feature map (IFM) and 8 weights from kernel channels and calculates a dot product of 8 terms in the depth (input channel) direction, in the example of FIG. 3 where each DPU 40 performs multiplications of 8 pairs of inputs:

DPUoutput=in[$O$]*w[0]+in[1]*w[1]+in[2]*w[2]+in[3]
*w[3]+in[4]*w[4]+in[5]*w[5]+in[6]*w[6]+in[7]
*w[7]

Figure 5:
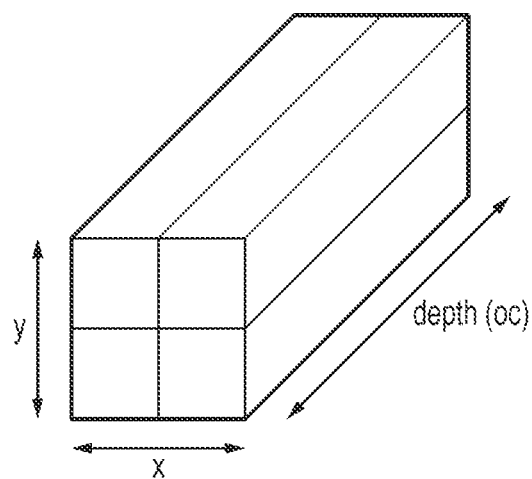
FIG. 5 schematically illustrates a micro block of the 2D convolution operation that can be computed in parallel by the dot product array.

For example, if the machine learning processor 6 has 256 multiply accumulate circuits this can be instantiated as 256/8=32 dot product units 40 which, as illustrated schematically in FIG. 5, could be allocated for calculating the dot product result for a 2×2×8 microblock of output values extending across 2 positions in the x direction, 2 positions in the y direction and 8 positions in the depth (output channel) direction. Hence, in the example of FIG. 2, the 4 DPUs 40 within the same column could be computing the output values for the 4 different output locations (x, y) for a given depth position while the 8 DPUs 40 within the same row could be calculating the 8 different output values for different depth positions at the same x, y position. Of course, if a different number of DPUs 40 was provided then the size of the microblock could vary. Also it would be possible for the microblock to scale in a different way, for example by calculating a greater number of x or y positions for a smaller number of depth positions using a given number of DPUs.

For some operations, such as FFT or complex filters, it can be useful to provide complex number versions of the matrix multiplier and dot product operations. Matrix multiplication can be considered a 2D convolution with a kernel size of 1×1. Hence, for a complex number version of the convolution operation the convolution operation can be defined as follows:

$$ofm[y, x, oc].re =$$
$$\text{sum}_{ky,kx,ic}(ifm[y+ky, x+kx, ic].re * weight[oc, ky, kx, ic].re -$$
$$ifm[y+ky, x+kx, ic].im * weight[oc, ky, kx, ic].im)$$
$$ofm[y, x, oc].im =$$
$$\text{sum}_{ky,kx,ic}(ifm[y+ky, x+kx, ic].re * weight[oc, ky, kx, ic].im$$
$$+ ifm[y+ky, x+kx, ic].im * weight[oc, ky, kx, ic].re)$$

Here, the terms with a suffix ".re" refer to the real part (component) of a complex number and the terms with the suffix ".im" refer to the imaginary part (component) of the complex number. To simplify processing of the real and imaginary components of a complex number, it can be useful to interleave the real and imaginary components within the input vectors so that, for example, for the output feature map ofm[y,x,2*oc+0] holds ofm[y,x,oc].re and ofm[y,x,2*oc+1] holds ofm[y,x,oc].im, with a similar arrangement of the real and imaginary components within the input feature map and weight vectors. This means that both the input vectors a and b have respective subsets of vector elements allocated for the real components of a number of complex numbers and the other subset of elements allocated for the imaginary components. The real and imaginary components of a particular complex number are positioned at adjacent elements of the vector 'a' or 'b'.

At first sight, one may think that implementing complex dot product operations would require specialised circuit logic to provide the required operations, since the calculation of the real part of the output value requires the subtraction of the product of the imaginary parts from the product of the real parts of the complex numbers being multiplied and the calculation of the imaginary part of the output value requires an addition of the respective products of the real part of one of the numbers being multiplied with the imaginary part of the other number.

One way to implement a complex matrix multiply operation using circuitry designed for a real matrix multiply operation can be to rewrite a complex N×N matrix as a real 2N×2N matrix by mapping the complex number x+i*y to the 2×2 rotation matrix [[x, −y], [y, x]]:

$$\begin{bmatrix} x00+i*y00 & x01+i*y01 \\ x10+i*y10 & x11+i*y11 \end{bmatrix} \rightarrow \begin{bmatrix} x00 & -y00 & x01 & -y01 \\ y00 & x00 & y01 & x01 \\ x10 & -y10 & x11 & -y11 \\ y10 & x10 & y11 & x11 \end{bmatrix}$$

This would allow a complex N×C by C×M matrix multiply to be done in a 2N×2C×2M=8*N*M*C real multiplies. This is twice as many multiplies as the 4*N*M*C normally needed for a complex operation (four real multiplies for each complex multiply as shown above), due to each complex value being repeated.

To avoid incurring the cost of these extra multiplies, the inventors have recognised that actually it is possible to implement such complex dot product operations with a relatively simple manipulation of the input vectors a, b supplied to the DPUs 40 of the dot product array 30, so that a dot product array designed for real number dot product operations can be reused for complex dot product operations with little modification of the dot product unit hardware itself, which is typically the area and power critical element of the hardware design. This means that each complex multiplication still only needs four multiplications rather than eight as in the matrix mapping example above.

Figure 7:
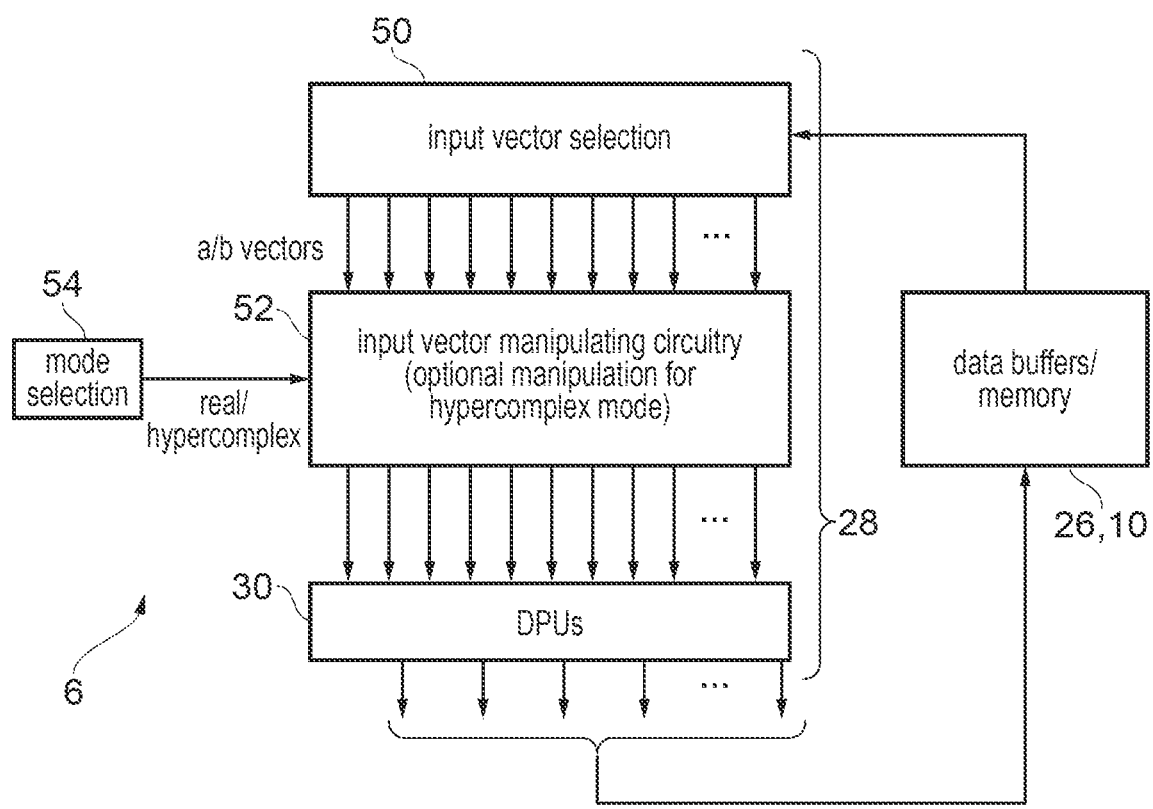
FIG. 7 illustrates use of input vector manipulating circuitry to manipulate inputs to the dot product units in a hypercomplex number mode.

Hence, FIG. 7 shows an example of components of the machine learning processor 6, in which the machine learning processing circuitry 28 includes input vector selection circuitry 50, input vector manipulating circuitry 52, mode selection circuitry 54 and the dot product array 30.

The input vector selection circuitry 50 selects data from the internal data buffers 26 of the machine learning processor 6 or from memory 10, and forms the respective pairs of input vectors a, b to be supplied for each DPU. As mentioned above, there may be data reuse between different DPUs 40 so that the DPUs 40 may be supplied with various combinations of a common set of input vectors so that the same a inputs can be reused with different b inputs or vice versa.

The input vector manipulating circuitry 52 applies an optional manipulation to one or both of the input vectors supplied to each DPU, when the mode selection circuitry 54 selects that the operation is to be performed in a hypercomplex mode. When the current mode is a real number mode then the input vector manipulating circuitry simply 52 supplies the input vector selected by the input vector selection circuitry 50 to the dot product array 30 unchanged. The hypercomplex mode is a mode for supporting at least the complex number versions of the dot product operations as discussed above, but as discussed further later on it is also possible for the hypercomplex number mode to support other types of hypercomplex number which may generalise the complex numbers into additional dimensions of number space. The mode selection circuitry 54 may select the current mode of operation for the machine learning processing circuitry 28 depending on parameters configured by the configuration commands received via the command interface 20, such as an operation type parameter which may define whether a real number matrix multiply or a hypercomplex matrix multiply (e.g. a complex matrix multiply) is to be performed.

To support the complex number dot product operation, in the hypercomplex number mode the DPUs 40 of the dot product array 30 are logically divided into groups of two DPUs 40 with each group calculating the respective real and imaginary components of a complex dot product result. The input vector selection circuitry 50 selects the a and b inputs for the DPUs 40 within the same group so that, prior to any manipulation applied by the input vector manipulating circuitry 52, values of the 'a' inputs are the same for each DPU 40 within the group and the values of the 'b' inputs are the same for each DPU 40 in the group, although as mentioned below the input vector manipulating circuitry 52 may then apply different manipulations specific to the particular components of the complex dot product result being calculated.

Figure 6:
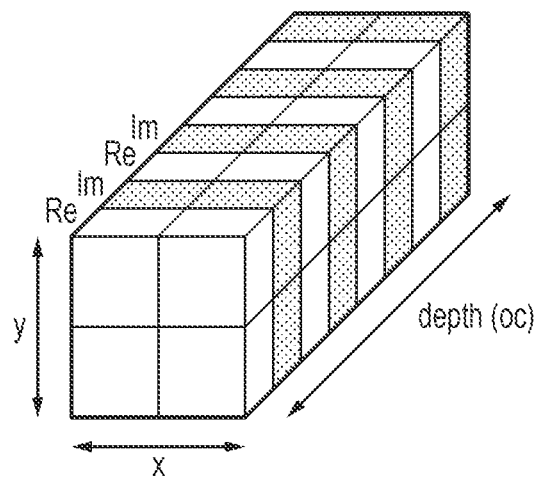
FIG. 6 schematically illustrates allocating the dot product units into groups with each group including dot product units for generating different components of a hypercomplex dot product result.

As shown in FIG. 6, as each pair of two DPUs now calculate the respective real and imaginary components of a single complex dot product result, then this means that half the number of output values are able to be calculated in parallel. In the example of FIGS. 2 and 6 the splitting of the dot product unit into groups is in the depth dimension so that two DPUs which previously would have been calculating output values for adjacent depth positions and the same x, y position in the real number mode (as shown in FIG. 5) are now calculating the real and imaginary components of a single complex number representing the complex dot product result for a given depth position and a given x, y position. For example, as shown in FIG. 2, adjacent DPUs can be used to generate the real and imaginary components respectively (note that while FIG. 2 shows each column of DPUs sharing the same 'b' input for the real number mode, in the complex number mode two adjacent columns will share the same 'b' input prior to the manipulation being applied by the input vector manipulating circuitry 52).

While in this example the real and imaginary DPUs are allocated in the depth dimension, in implementations which split the dot product operations for implementing the convolutional neural network in a different manner it may also be possible to have the real imaginary components for a given complex number being calculated by different DPUs which in the real number mode would have been calculating output values for different x, y positions. However, often the number of output channels to be calculated may be greater than the number of different x, y positions for which additions are to be performed and so it may be simpler to use the depth dimension to allocate the groups of DPUs which relate to the same complex number.

Figure 8:
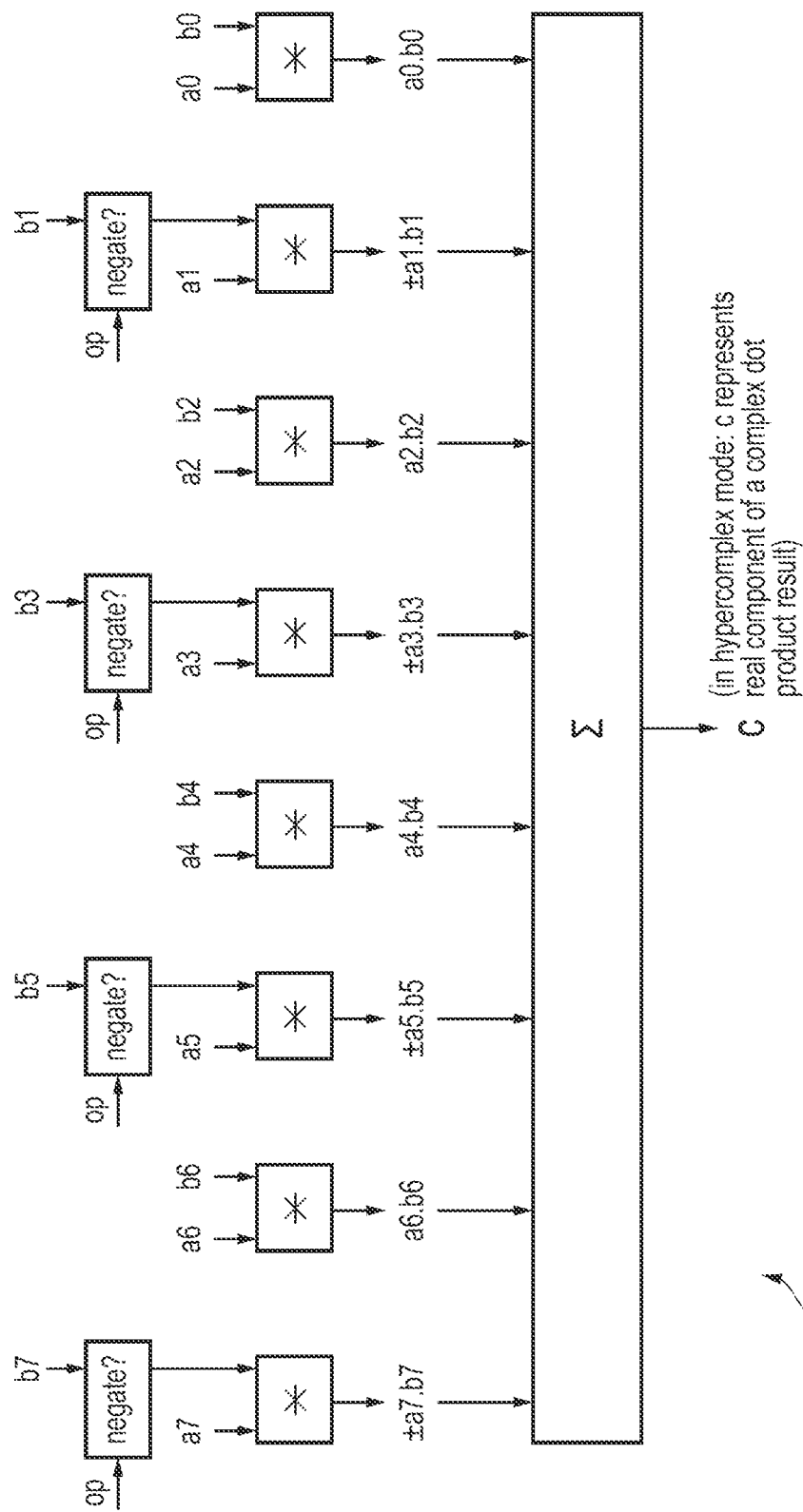
FIG. 8 illustrates an input manipulation applied for the dot product units which generate the real component of a complex number.
Figure 9:
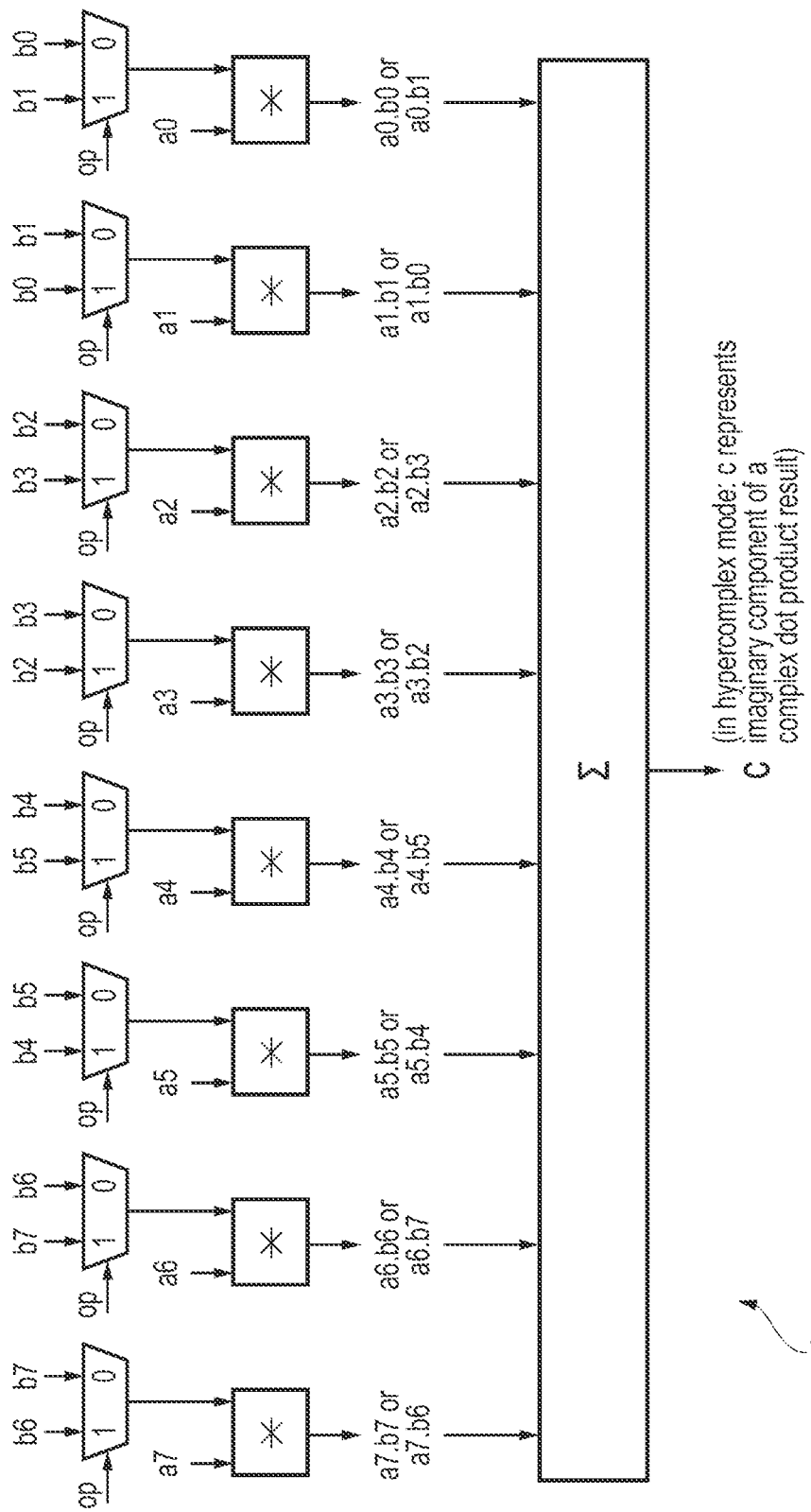
FIG. 9 illustrates an input manipulation applied for the dot product units which generate an imaginary component of a complex number.

FIGS. 8 and 9 illustrate the input vector manipulations performed by the input vector manipulating circuitry 52 which are specific to the particular component of a complex number which is being generated by a particular DPU 40.

FIG. 8 illustrates the input vector manipulation performed for a DPU 40 which is calculating the real component of a complex product result when in the hypercomplex number mode. For the DPUs that are producing real outputs, the second input vector b has alternate elements negated when in the hypercomplex number mode. Hence, every other element has its sign bit inverted. The dot product array 30 may operate on data values represented in a sign-magnitude representation, so the negation can be very efficient as it just needs the sign bit to be flipped in state, rather than requiring any two's complement operation. The elements of the first input vector a are simply input to the DPU 40 unchanged and also the remaining elements of the second input vector b are left unchanged and not negated. For example, here all the elements a0-a7 of the first input vector and the elements b0, b2, b4, b6 of the second input vector which represent the real input components of several different complex numbers are left unchanged, while the vector elements b1, b3, b5, b7 which represent the imaginary components of the corresponding complex numbers are negated. This means that when the DPU 40 multiplies the manipulated pairs of elements of the first and second input vectors then this has the effect of producing the sum:

$$c = a0*b0 - a1*b1 + a2*b2 - a3*b3 + a4*b4 - a5*b5 + a6*b6 - a7*b7$$

which represents the correct outcome of calculating the real component of a complex dot product result, when the even-numbered vector elements represent the real components and the odd-numbered elements represent the imaginary components of the input complex numbers being processed.

As shown in FIG. 8, the negation of the alternate elements of the second input vector b can be selectively applied depending on a mode control input "op" which indicates whether the current operation is to be performed according to the real number mode or the hypercomplex number mode.

Similarly, FIG. 9 illustrates the input vector manipulation to be applied to a DPU 40 which is to calculate the imaginary component of a complex dot product result. In this case, in the (hyper)complex number mode, each pair of inputs of the second input vector B is swapped so that, while in the real number mode the products calculated would have been a0.b0, a1.b1, etc., in the (hyper)complex number mode the products calculated are a0.b1, a1.b0, a2.b3, a3.b2 etc. Hence, overall the sum calculated is:

$$c=a0*b1+a1*b0+a2*b3+a3*b2+a4*b5+a5*b4+a6*b7+a7*b6$$

hence this corresponds to the correct dot product result for generating the imaginary part of a complex dot product, when the even-numbered elements represent the real components and the odd-numbered elements represent the imaginary components. The swapping of the pairs of elements could be implemented, for example, using multiplexers as shown in the example of FIG. 9, which may be controlled based on an operation type signal 'op' which signals whether the current operation is to be performed according to the real number mode or the hypercomplex number mode.

Note that while FIGS. 8 and 9 illustrate an example where it is the second input vector 'b' that is manipulated and the first input vector 'a' is unchanged regardless of whether the real number mode or the hypercomplex number mode is used, in other examples it could be the first input vector 'a' that is permuted. Also, it would be possible for both the 'a' and 'b' input vectors to be partially manipulated. For example, for element positions 0 to 3 the 'a' elements could be manipulated and for element positions 4 to 7 it could be the 'b' elements that are manipulated, to give the same result as if all manipulations have been applied to the same input vector. Hence, in general it is sufficient that for any given pair of hypercomplex numbers represented by respective subsets of the elements of the first and second input vectors, one of those pairs of subsets of elements is manipulated and the other is not, but it does not need to be the same input vector that is manipulated for each subset of elements representing different hypercomplex numbers.

Also, while FIGS. 6, 8 and 9 show an example where the hypercomplex mode is a complex number mode where the hypercomplex numbers processed are complex numbers having the form z=x+iy where x is the real component, y is the imaginary component and i is the square root of minus 1, so (x,y) represents a 2D point, the same approach can be extended to other number algebras which generalise the complex number to a hypercomplex number having more than two dimensions of number space. Such a hypercomplex number can have more than two components.

An example of such a hypercomplex number may be a Quaternion which is a number in the form a+bi+cj+dk where 1, i, j, k are the unit vectors in four dimensional number space. While for complex numbers the DPUs are divided into groups of two DPUs, for Quaternions they can be divided into sets of four DPUs for calculating the four different components of a hypercomplex dot product result. Again, the respective components of Quaternion numbers represented in the A and B inputs may be interleaved so that each subset of four adjacent elements of the input vectors can be used to represent the different components of a Quaternion provided as an input for the dot product operation.

For the complex number mode above, the input manipulations applied in FIGS. 8 and 9 to a particular set of 'b' elements (b0, b1) representing the real and imaginary components of a complex number respectively are:

for the DPU that calculates the real component of a complex number result: (b0, −b1), i.e. b0 will be multiplied by a0 and −b1 will be multiplied by a1;

for the DPU that calculates the imaginary component of a complex number result: (b1, b0), i.e. bi will be multiplied by a0 and b0 will be multiplied by a1.

Such manipulations are applied for each respective complex number in the input vector.

Extending this to Quaternions, for each set of four DPUs 40 which generate the respective components of the hypercomplex number representing the Quaternion dot product result, the input manipulations to be applied to a given set of four 'b' elements (b0, b1, b2, b3), which represent the values a, b, c, d representing the coordinates in the '1', 'i', 'j' and 'k' dimensions as in the expression a+bi+cj+dk above, are as follows:

for the DPU that calculates the component 'a' in the '1' dimension for a Quaternion dot product result: (b0, −b1, −b2, −b3), i.e. the dot product result will be based on a0*b0−a1*b1−a2*b2−a3*b3;

for the DPU that calculates the component 'b' in the 'i' dimension for a Quaternion dot product result: (b1, b0, b3, −b2), i.e. the dot product result will be based on a0*b1+a1*b0+a2*b3−a3*b2;

for the DPU that calculates the component 'c' in the 'j' dimension for a Quaternion dot product result: (b2, −b3, b0, b1), i.e. the dot product result will be based on a0*b2−a1*b3+a2*b0+a3*b1;

for the DPU that calculates the component 'd in the 'k' dimension for a Quaternion dot product result: (b3, b2, −b1, b0), i.e. the dot product result will be based on a0*b3+a1*b2−a2*b 1+a3*b0.

Similar manipulations can be proposed for hypercomplex numbers in other dimensions, such as Octonions.

Hence, it can be seen that even for hypercomplex numbers with greater than 2 dimensions, the hypercomplex dot product operation can be performed using a dot product array 30 designed for real number operation, with relatively simple manipulation of the input vectors that would otherwise be applied, so as to require relatively little modification to the overall data flow of the machine learning processor 6.

Figure 10:
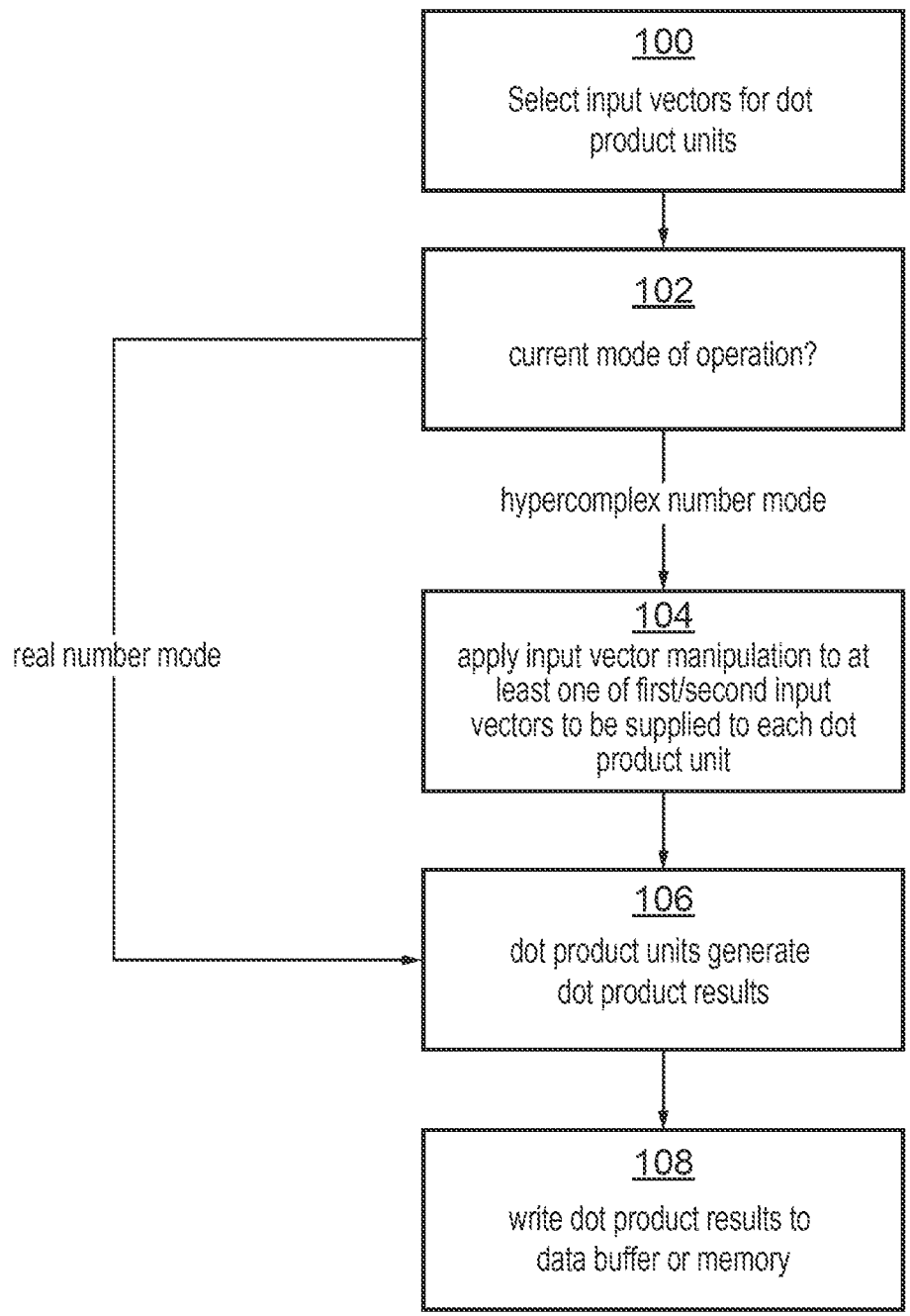
FIG. 10 is a flow diagram showing a method of processing dot product operations.

FIG. 10 is a flow diagram illustrating a method of performing dot product operations. At step 100 the input vector selection circuitry 50 selects the input vectors to be supplied for the various dot product units 40 of the dot product array 30. At step 102 the mode selection circuitry 54 determines the current mode of operation, which may depend on the type of operation requested to be performed based on the configuration commands received at the command interface 20. If the current mode is a hypercomplex mode then at step 104 the input vector manipulating circuitry 52 applies an input vector manipulation to at least one of the first and second input vectors a, b to be supplied to each dot product unit 40. If the current mode is the real number mode then step 104 is omitted and the input vector manipulation is not performed so that the input vectors selected at step 100 are passed unchanged to the DPUs. Regardless of which mode is being used, at step 106 the DPUs 40 each generate their respective dot product results in the same way, by generating a result equivalent to adding the products of corresponding pairs of (either unmanipulated or manipulated depending on which mode is used) vector elements of the input vectors. At step 108 each dot product result calculated by the DPUs 40 is written back to the data buffer 26 or to memory. The interleaving of the respective components of the hypercomplex number within the input vectors and in a corresponding way within the respective scalar results generated by a group of DPUs mean that the respective components of a hypercomplex dot product result in the hypercomplex number mode may naturally be in the correct arrangement for reading as an input vector for a later dot product operation, so as to not require a significant amount of rearrangement once in the data buffers 26. This is achieved because of the way in which the DPUs calculating the respective components of a hypercomplex number (e.g. real and imaginary components for a complex number) are allocated so that the DPUs which would output values that would be written to adjacent positions in memory are allocated for generating the different components of the same hypercomplex result so that these components may stay together when moved across the chip according to the data flow already implemented for real number calculations.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a dot product array comprising a plurality of dot product circuits each to process a respective pair of first and second input vectors to generate a respective dot product result indicating a sum of products of corresponding pairs of elements of the first and second input vectors, where in a real number mode of operation, each dot product result and each element of each pair of first and second input vectors represents a respective real number; and
input vector manipulating circuitry to apply, when in a hypercomplex number mode of operation, an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

2. The apparatus according to claim 1, in which, other than the input vector manipulation applied by the input vector manipulating circuitry, operation of the dot product array is the same in both the real number mode and the hypercomplex number mode.

3. The apparatus according to claim 1, in which, in the hypercomplex number mode, for a given hypercomplex number represented by one of the first and second input vectors, the subset of elements representing the given hypercomplex number is at a plurality of adjacent vector element positions within said one of the first and second input vectors.

4. The apparatus according to claim 1, in which the input vector manipulating circuitry is configured to apply a component-specific input vector manipulation to said at least one of the first and second input vectors, where the component-specific input vector manipulation for a given dot product circuit depends on which component of the hypercomplex dot product result is to be represented by the dot product result generated by the given dot product circuit.

5. The apparatus according to claim 1, comprising input vector selection circuitry to select the pair of first and second input vectors for each dot product circuit of the dot product array, in which, in the hypercomplex number mode, for each of the at least two dot product circuits within a given group of the dot product array, the input vector selection circuitry is configured to select the same pair of first and second input vectors.

6. The apparatus according to claim 5, in which in the hypercomplex number mode, the input vector manipulating circuitry is configured to apply different component-specific manipulations to at least one of said same pair of first and second input vectors to generate different pairs of manipulated first and second input vectors to be processed by the at least two dot product circuits of the given group.

7. The apparatus according to claim 1, in which each hypercomplex number is a complex number comprising a real component and an imaginary component, the hypercomplex dot product result is a complex dot product result, each subset of elements comprises two elements, and each group of dot product circuits comprises two dot product circuits.

8. The apparatus according to claim 7, in which, in the hypercomplex number mode, for each dot product circuit that is to generate a dot product result representing the imaginary component of a complex dot product result, the input vector manipulation comprises, for a given corresponding pair of complex numbers represented in the first and second input vectors by a first subset of two elements of the first input vector and a second subset of two elements of the second input vector, swapping the two elements of one of said first subset of elements and said second subset of elements.

9. The apparatus according to claim 7, in which, in the hypercomplex number mode, for each dot product circuit that is to generate a dot product result representing the real component of a complex dot product result, the input vector manipulation comprises, for a given corresponding pair of complex numbers comprising a first complex number represented in the first input vector by a first real-component element and a first imaginary-component element and a second complex number represented in the second input vector by a second real-component element and a second imaginary-component element, negating one of the first imaginary-component element and the second imaginary-component element.

10. The apparatus according to claim 1, in which each element of the first and second input vectors is represented in a sign-magnitude representation.

11. The apparatus according to claim 1, in which the plurality of dot product circuits are configured to generate their respective dot product results in parallel.

12. The apparatus according to claim 1, in which, in the hypercomplex number mode, for a given hypercomplex dot product result, the dot product array is configured to generate the plurality of components of the given hypercomplex dot product result in parallel.

13. The apparatus according to claim 1, comprising input vector selection circuitry to select the pair of first and second input vectors for each dot product circuit of the dot product array, where for two or more different dot product circuits of the dot product array, the input vector selection circuitry is configured to reuse a same input vector as the unmanipulated value of one of the pair of first and second input vectors prior to any manipulation being applied by the input vector manipulating circuitry, with different input vectors being provided as the unmanipulated value of the other of the pair of first and second input vectors for said two or more different dot product circuits.

14. The apparatus according to claim 1, in which the apparatus is a hardware accelerator.

15. The apparatus according to claim 1, in which the apparatus is a machine learning processor.

16. The apparatus according to claim 1, comprising hardware circuitry to accelerate processing of at least one of: matrix multiplication operations, and convolutional neural network operations;
the hardware circuitry comprising the dot product array.

17. A method comprising:
processing respective pairs of first and second input vectors using a plurality of dot product circuits of a dot product array, to generate respective dot product results each indicating a sum of products of corresponding pairs of elements of a corresponding pair of first and second input vectors, where in a real number mode of operation, each dot product result and each element of each pair of first and second input vectors represents a respective real number; and
when in a hypercomplex number mode of operation, applying an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

18. A non-transitory computer-readable medium to store computer-readable code for fabrication of an apparatus comprising:
a dot product array comprising a plurality of dot product circuits each to process a respective pair of first and second input vectors to generate a respective dot product result indicating a sum of products of corresponding pairs of elements of the first and second input vectors, where in a real number mode of operation, each dot product result and each element of each pair of first and second input vectors represents a respective real number; and
input vector manipulating circuitry to apply, when in a hypercomplex number mode of operation, an input vector manipulation to at least one of the first and second input vectors to be supplied to each dot product circuit of the dot product array, to cause the dot product array to generate a plurality of hypercomplex dot product results each indicating a sum of hypercomplex products of corresponding pairs of hypercomplex numbers, where in the hypercomplex number mode each of the first and second input vectors comprises a plurality of subsets of elements with each subset representing a respective hypercomplex number for which respective components of the hypercomplex number are represented by different elements of the subset, and each hypercomplex dot product result comprises a plurality of components represented by the dot product results generated by a corresponding group of at least two dot product circuits of the dot product array.

* * * * *